(No Model.) 2 Sheets—Sheet 2.
D. S. HITCHCOCK.
CAMERA SHUTTER.
No. 328,033. Patented Oct. 13, 1885.
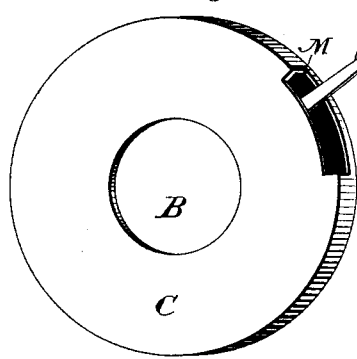
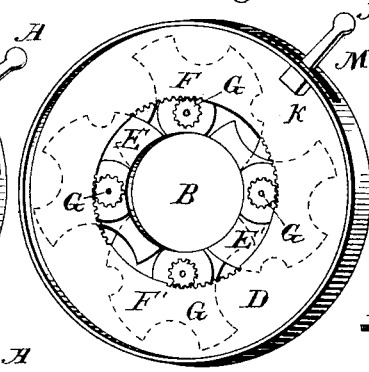
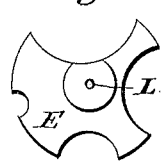
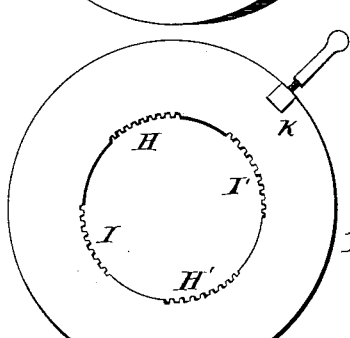
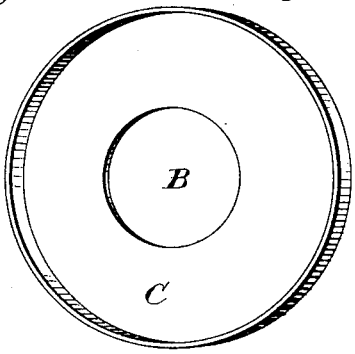
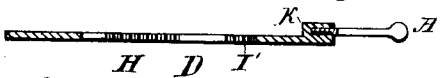
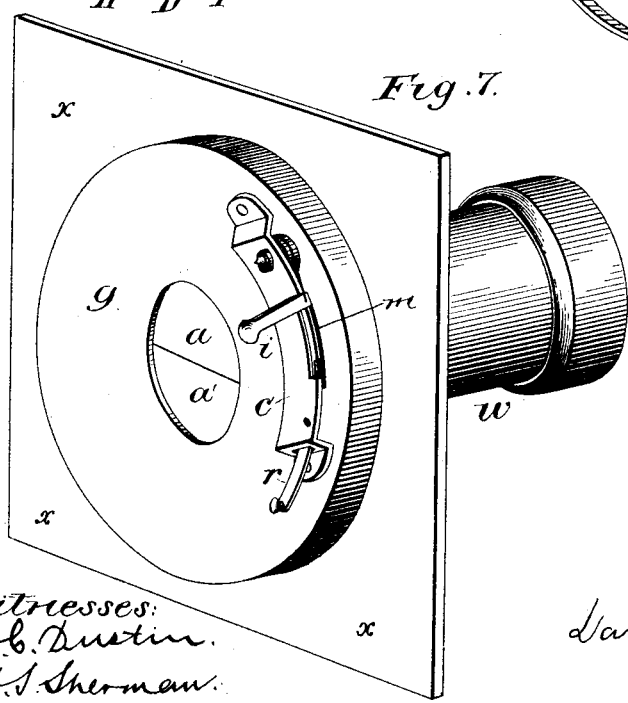
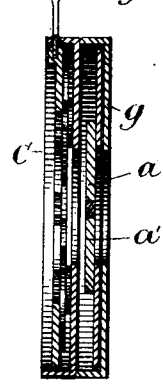
Witnesses:
A. C. Austin.
H. S. Sherman.
Inventor.
David S. Hitchcock

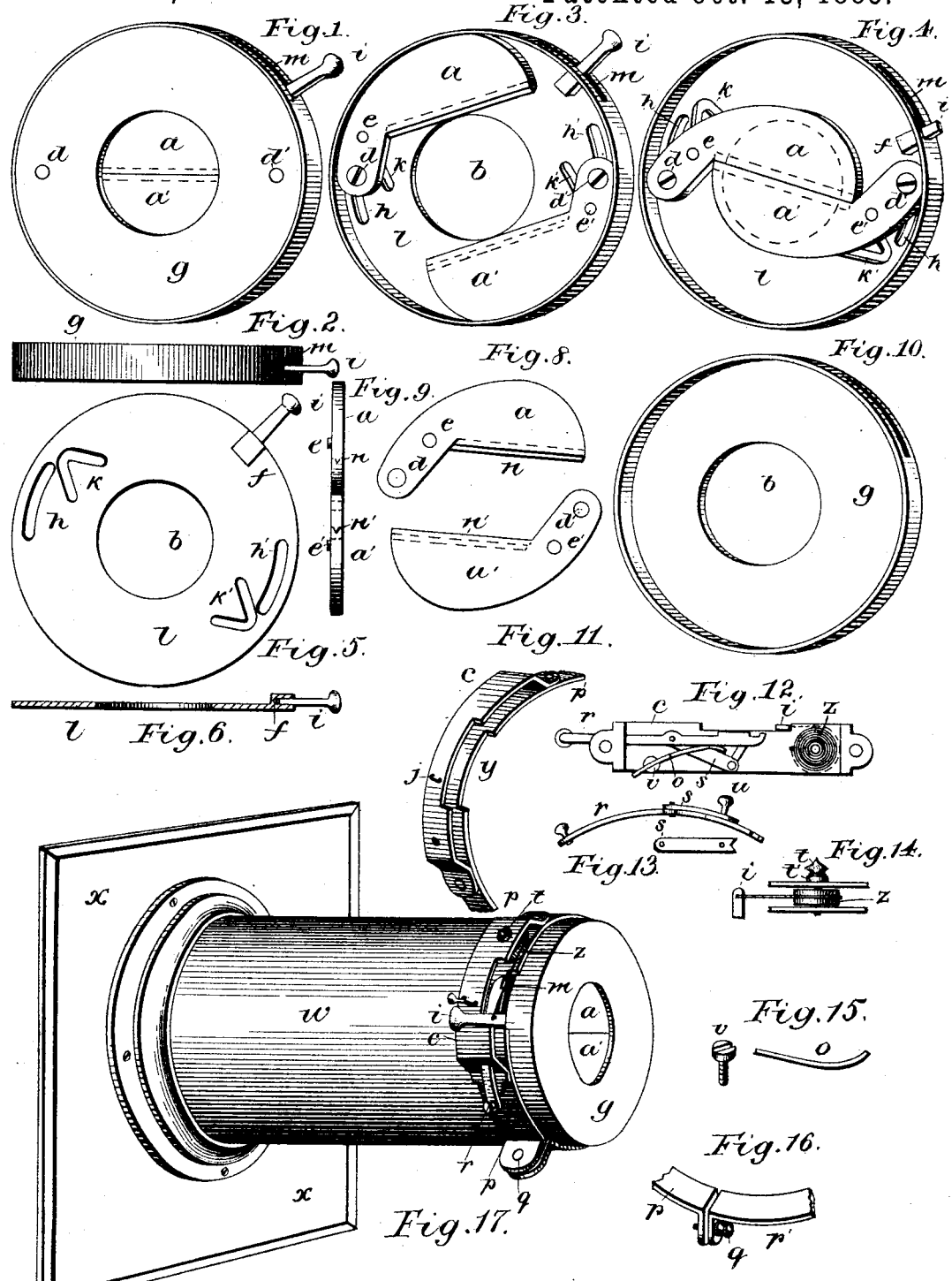

UNITED STATES PATENT OFFICE.

DAVID S. HITCHCOCK, OF CLEVELAND, OHIO, ASSIGNOR TO THE HITCHCOCK SHUTTER MANUFACTURING COMPANY, OF SAME PLACE.

CAMERA-SHUTTER.

SPECIFICATION forming part of Letters Patent No. 328,033, dated October 13, 1885.

Application filed September 11, 1884. Serial No. 142,782. (No model.)

*To all whom it may concern:*

Be it known that I, DAVID S. HITCHCOCK, a citizen of the United States, residing at Cleveland, Ohio, have invented a new and useful Improvement in Camera-Shutters, of which the following is a specification.

My invention relates to improvements in cameras and other optical instruments for the purpose of diaphragming and the exposure of the latent image; and the objects of my invention are, first, to provide a practical shutter mechanism for the exposure, both rapid and prolonged, of the latent image; second, to provide a practical mechanism for convenient diaphragming of such instruments in connection with or separate from the shutter mechanism. I attain these objects by the mechanism and devices illustrated in the accompanying drawings, in which similar letters refer to similar parts throughout the several views.

Sheet No. 1, Figure 1 shows the shutter mechanism when inclosed in the case with valves closed. Fig. 2 shows sectional view of same. Fig. 3 is the open case, showing mechanism with valves open. Fig. 4 is same with valves closed. Fig. 5 is the movable plate with slots and lever. Fig. 6 is sectional view of same. Fig. 7, Sheet No. 2, is a perspective view of shutter mechanism attached to back end of camera. Fig. 8 is the shutter-valves. Fig. 9 is sectional view of same. Fig. 10 is the empty case. Fig. 11 is a section of the attachment band and cap. Fig. 12 is a view of the band attachment. Fig. 13 is a view of the let-off arm and safety-bar. Fig. 14 is a sectional view of spring and lever connection. Fig. 15 is a spring for holding the arm in place. Fig. 16 is a section of band, showing the method of attaching to tube and tightening the band by means of a screw. Fig. 17 is a perspective view of shutter mechanism attached to front of camera.

Sheet No. 2, Fig. 18 shows the diaphragm in its case. Fig. 19 shows diaphragm mechanism in open case. Fig. 20 is a sectional view of Fig. 18. Fig. 21 is a diaphragm-plate. Fig. 22 is a sectional view of two diaphragm-plates with collars and pinions. Fig. 23 is a face and sectional view of pinion. Fig. 24 is a movable plate with lever and ratchet-teeth. Fig. 25 is a sectional view of same. Fig. 26 is the empty case. Fig. 27 is a sectional view of shutter mechanism and the diapragm mechanism combined.

To enable others skilled in the art to make and use my invention, I herewith describe its construction and operation.

In Fig. 1, $g$ is a cup or case of metal or other suitable material about one-fourth inch deep, circular in form, and of any required size to fit the tube of the optical instrument. This case has a close-fitting cover. Both case and cover have the circular opening $b$ of any required size, and slot $m$ on side. The case $g$, containing the shutter-valves $a\ a'$, is substantially of the form and shape shown in Fig. 8. It is made of hard rubber or other suitable material. The contact-faces $n\ n'$ are made with tongue-and-groove edges, and these faces and edges are made of soft rubber or other material suitable for making a perfect contact to exclude all rays of light and to avoid noisy concussion. The valves $a\ a'$ are pivoted to the inside face of case $g$ by means of fixed pivots $d\ d'$, on which the valves turn. $e\ e'$ are pins fixed firmly to the under side of the valves $a\ a'$, and extend through the movable plate $l$ and play in the cam-slots $k\ k'$. $l$ is a movable circular plate of thin metal or other suitable material, of a size to fit the inside of case $g$, and is made to revolve in the case $g$. Plate $l$ is provided with a central circular opening of same size and to correspond with opening $b$ in case $g$ and its cover. Lever $i$ is firmly fastened to plate $l$ at $f$ by rivets or otherwise. Plate $l$ is provided with two slots $h\ h'$, of form and location substantially as shown in Fig. 5, which slots allow plate $l$ to pass the pivots $d\ d'$. Plate $l$ is also provided with two V-shaped cam-slots, $k\ k'$, as shown in Fig. 5, in which cam-slots the pins $e\ e'$ are made to play. The movement of lever $i$ from one end to the other of slot $m$ in either direction opens and closes the valves $a\ a'$. Now, lever $i$ being at either end of slot $m$, the valves $a\ a'$ are closed. By moving lever $i$ half the distance of the slot $m$ the valves $a\ a'$ are opened, and by continuing the movement of lever $i$ to either end of slot $m$ the valves $a\ a'$ are closed.

In Fig. 12 is shown the mechanism used to control the working of lever $i$. This mechanism is fixed to band $p\ p'$ under and by cap

*c*, Fig. 11. The slot *y* in the band *p p'* and cap *c* is placed directly over slot *m*. *z* is a coiled spring fixed to band *p p'* and cap *c* at one end of slot *m*, and is provided with a loop attached to lever *i*, lever *i* being at that end of slot *m* which is nearest to spring *z*. *r* is an arm attached by a pin to band *p p'* near the opposite end of slot *m* and at a suitable distance from lever *i*, and is provided with two notches or teeth for holding lever *i*. *s* is a safety-bar attached to band *p p'* on the top of arm *r* by the same pin, as shown in Fig. 13, and is provided with the button *u*, which passes through the slot *j* in cap *c*, projecting above cap *c*, which button is used for moving the safety-bar *s*. *o* is a spring attached to band *p p'* by a slotted screw, *v*, and is used to hold arm *r* in position, as shown in Fig. 12. *t t'*, Fig. 14, are two nuts on cap *c* for adjusting the tension of spring *z*.

For prolonged exposure, throw the bar *s* over the arm *r*. This prevents lever *i* from being carried beyond the first notch on arm *r*, and opens the valves *a a'*. Then, when the exposure is sufficient, by pressing arm *r* the lever is released and returns to spring *z*, which closes the valves *a a'*. When desired for instantaneous exposure, lever *i* is carried to the first notch from spring *z* to properly focus the image, then lever *i* is carried to second notch, which closes valves *a a'*, and is then ready to let off. By pressing arm *r* the lever *i* is let off and returns to spring *z*, which causes the instantaneous opening and closing of the valves *a a'*.

In Fig. 18, C is a cup or case similar in material, size, and shape to cup or case *g* in Fig. 1, having a close-fitting cover and a central opening, B, in case and cover, as shown, with slot M on the side of the case. The diaphragm-plates E E' and F F' are made of thin metal, hard rubber, or other suitable material of a size suitable to the size of the case C, and of the shape and form substantially as shown in Fig. 21. I do not limit my invention to the number of plates shown in the drawings. One or more can be used by making slight changes in the shape and form of the several plates. Each of the plates E E' is provided with a raised collar of same material as the plate, or of other suitable material, of a thickness equal to that of the plate, and placed on the under side of the plates E E', as shown in E in Fig. 22. This is for the purpose of allowing the under faces of the plates E E' to pass over the upper faces of plates F F' when revolved. The plates F F' are provided with like raised collars on the upper face of each, as shown at F in Fig. 22.

L in Fig. 21 is a pin fixed to the inside of case C. The plate E is attached to the inside of case C by means of pin L. Each of the other plates, E' F F', are in like manner attached to inside of case C by means of pins similar to L, and on these pins the plates E E' F F', and pinions G G G G turn. Each of the plates E E' F F' is provided with a pinion, G, Fig. 23, firmly fixed to the upper face of the plate, Fig. 22, for the purpose of revolving the plates.

D, Fig. 24, is a movable plate of thin metal or other suitable material of a size to fit the inside of case C, having a central opening provided with ratchet-teeth, as shown in the drawings. A is a lever firmly fixed to plate D by screwing it into lug K, or in some other equivalent manner, and is used to operate plate D. The plate D is placed inside of case C over the plates E E' F F', so that the ratchet-teeth I I' H H' of the plate D shall fit in the teeth of the pinions G G G G, and the lever A shall fit into the slot M. By using four plates, as shown in the drawings, four different-sized diaphragms can be formed. By moving the lever A backward or forward, as the position of the plates may require to form any one of the four sizes of diaphragms provided for, the plate is revolved, and this movement revolves the four plates simultaneously by means of the ratchet-teeth and pinions in such manner as to form any one desired diaphragm of the four provided for.

The shutter-valves *a a'* with the above-described mechanism are so constructed that they may be used in the front, back, or center of a camera-tube or tube of other optical instruments.

The diaphragm-plates E E' F F', with the above described operating mechanism, are so constructed that they may be operated in combination with the shutter-valves and mechanism, Fig. 27, and may be used separately or in such combination in front of or at the back of or in the center of a camera-tube or other optical instrument, as may be desired.

When it is desired to use the shutter mechanism or the diaphragm mechanism, or both in combination, in the center of the tube of a camera or other optical instrument, a slot of the size required for the mechanism must be cut in the tube.

What I claim as my invention, and desire to secure by Letters Patent, is—

1. In a camera or other optical instrument, the combination of the shutter-valves *a a'*, the movable plate *l*, the lever *i*, the slots *k k'* and *h h'*, and the case *g*, with its cover, or their equivalents, all arranged as and for the purposes substantially as described.

2. The shutter-valves *a a'*, plate *l*, lever *i*, slots *k k'* and *h h'*, and case *g* with its cover, and the attachment-band *p p'*, the cap *c*, the arm *r*, the bar *s*, the spring *z*, the spring *o*, the screw *v*, the nuts *t t'*, or their equivalent, all combined with the tube of a camera or other optical instrument, and arranged substantially as and for the purposes described.

3. The movable circular plate *l*, of any size required, made of thin metal or other suitable material having a central opening of any required size, a lever or other device to move the plate, and slots *h h' k k'*, substantially as and for the purposes described.

4. The diaphragm-plates E E' F F,' with collars, the pinions G G G G, the plate D with ratchet-teeth I I' H H', the lever A, the case C, and its cover, all arranged and combined substantially as and for the purposes described.

5. The diaphragm-plates E E' F F', of any required size, made of thin metal or other suitable material having a raised collar and pinion on the under or upper face of each, as may be required, to allow said plates to pass each other when revolved, arranged substantially as and for the purposes described.

6. Two or more diaphragm-plates, each having a raised collar and pinion, combined with a movable circular ratchet-plate of suitable size and material with circular opening, ratchet-teeth, and lever, arranged substantially as and for the purposes described.

7. The combination of one or more diaphragm-plates with pinions and a movable ratchet-plate, substantially as and for the purposes described.

8. In a camera or other optical instrument, the shutter-valves, the movable plate with its lever and slots, combined with the diaphragm-plates, the pinions, the movable ratchet-plate, the lever, and case, substantially as described.

DAVID S. HITCHCOCK.

Witnesses:
 HENRY S. SHERMAN,
 A. C. DUSTIN.